(12) United States Patent
Ishiguro

(10) Patent No.: US 7,270,483 B2
(45) Date of Patent: Sep. 18, 2007

(54) ROLLING BEARING UNIT

(75) Inventor: Kenji Ishiguro, Toyota (JP)

(73) Assignee: Koyo Seiko Co., Ltd., Osaka-Shi, Osaka (JP)

( * ) Notice: Subject to any disclaimer, the term of this patent is extended or adjusted under 35 U.S.C. 154(b) by 202 days.

(21) Appl. No.: 11/211,077

(22) Filed: Aug. 25, 2005

(65) Prior Publication Data

US 2006/0045401 A1 Mar. 2, 2006

(30) Foreign Application Priority Data

Aug. 27, 2004 (JP) ............................ P2004-247934

(51) Int. Cl.
F16C 41/00 (2006.01)
(52) U.S. Cl. ...................................... 384/448; 384/544
(58) Field of Classification Search ................ 384/448, 384/544, 589
See application file for complete search history.

(56) References Cited

U.S. PATENT DOCUMENTS 5,782,565 A * 7/1998 Bertetti et al. .............. 384/544
6,036,370 A * 3/2000 Kessen et al. ............... 384/448
2004/0228556 A1* 11/2004 Ohtsuki et al. .............. 384/448

FOREIGN PATENT DOCUMENTS

JP 2003-121454 4/2003

* cited by examiner

Primary Examiner—Thomas R. Hannon
(74) Attorney, Agent, or Firm—McGinn IP Law Group, PLLC

(57) ABSTRACT

A rolling bearing unit has an inner shaft and an inner race that is fitted on an outer circumferential surface of the inner shaft at one end side thereof. The inner race is fixed to the inner shaft by a clamping portion resulting from an end portion of the inner shaft. An annular stepped portion is formed on an outer end face of the inner race on a radially outward side thereof. A pulser ring is disposed within the stepped portion and is then held between the stepped portion and the clamping portion to thereby be fixed in place thereat.

9 Claims, 2 Drawing Sheets

ROLLING BEARING UNIT

BACKGROUND OF THE INVENTION

The present invention relates to a wheel supporting rolling bearing unit.

As wheel supporting rolling bearing units, there exists a wheel supporting rolling bearing unit in which an inner race is fitted on an outer circumferential surface of an inner shaft at one end thereof and one end portion of the inner shaft is clamped against an outer end face of the inner race so as to fix the inner race to the inner shafts and a pulser ring is attached to the side of the inner race in such a manner as to face a magnetic sensor on the side of an outer race for detecting rotation (refer to Patent Document JP-A-2003-121454). The pulser ring is fitted in the shoulder portion of the inner race to thereby be fixed thereto in such a manner that a detecting portion thereof faces the magnetic sensor in the axial direction.

In the related rolling bearing units, since the position of the detecting portion of the pulser ring relative to the magnetic sensor, that is, the detection diameter of the detecting portion is determined by the outside diameter of the shoulder portion of the inner race, it is necessary to use an inner race that has a shoulder portion whose outside diameter satisfies the required detection diameter. Due to this, once there occurs a change in the detection diameter, the inner race needs to be changed to one having a shoulder portion whose outside diameter satisfies the changed detection diameter, this increasing the production costs of the rolling bearing units. In addition, when attempting to cut the outside diameter portion of the shoulder portion so as to make the outside diameter of the shoulder portion match the changed detection diameter, the cutting work has to involve some costs.

SUMMARY OF THE INVENTION

In view of the problem, an object of the present invention is to provide a rolling bearing unit in which the setting of the position of a detecting portion of a pulser ring to an inner race can be performed without changing the outside diameter of a shoulder portion of the inner race.

In order to solve the aforesaid object, the invention is characterized by having the following arrangement.

(1) A rolling bearing unit comprising:

an inner shaft that includes an outer circumferential surface and a clamping portion formed by bending one end portion of the inner shaft;

an inner race fitted on the outer circumferential surface of the inner shaft and clamped by the clamping portion, whereby the inner race is fixed to the inner shaft, the inner race including an annular stepped portion formed on a radially outward side of an outer end face of the inner race; and a pulser ring that is disposed in the stepped portion and is held between the stepped portion and the clamping portion, whereby the pulser ring is fixed to the stepped portion.

(2) The rolling bearing unit according to (1), wherein the pulser ring comprises a metallic support ring and a magnetized rubber.

(3) The rolling bearing unit according to (2), wherein the support ring includes a first annular portion situated on an inside diameter side, a cylindrical portion which extends axially outwardly from a radially outward edge of the first annular portion, and a second annular portion which extends radially outward from an axially outer edge of the cylindrical portion.

(4) The rolling bearing unit according to (3), wherein the first annular portion, the cylindrical portion and the second annular portion are axially outwardly arranged in this order.

(5) The rolling bearing unit according to (1), wherein the pulser ring is fixed to the inner race so as to axially face a magnetic sensor which is a rotation sensor attached to an outer race, and the pulser ring has magnetic poles which alternately differ along a circumferential direction.

(6) The rolling bearing unit according to (1), wherein the stepped portion has a uniform radial width which extends on the outer end face of the inner race from a radially outward edge of the inner race to an intermediate portion of the inner rare and a depth which substantially corresponds to a thickness of the pulser ring.

(7) The rolling bearing unit according to (5), wherein an outer side face of the pulser ring which is disposed in the stepped portion is clamped by the clamping portion, whereby the pulser ring is fixed to the outer end face of the inner race.

(8) The rolling bearing unit according to (1), wherein an inside diameter of the stepped portion is set smaller than an outside diameter or the clamping portion so that the clamping portion overlaps the stepped portion partially or entirely in the axial direction.

(9) The rolling bearing unit according to (3), wherein following inequality is satisfied:

$$Rd < Rk < Ri < Rc$$

where $Rd$ represents an inside diameter of the stepped portion, $Rk$ represents an outside diameter of the clamping portion, $Rc$ represents an outside diameter of the cylindrical portion and $Ri$ represents an outside diameter of a shoulder portion of the inner race.

According to the invention, when a deviation of the position of the detecting portion, that is, the detection diameter of the pulsar ring relative to the magnetic sensor deviates, since the positional deviation can be eliminated by modifying the position of the pulser ring disposed within the stepped portion to a direction which cancels the deviation and then holding again the pulser ring between the stepped portion and the clamping portion so as to be fixed thereat, the necessity is obviated of canceling the deviation in position by using an inner race which has a different shoulder diameter or cutting the shoulder portion of the inner race. Since this means that the pulser ring can be mounted even on inner races having different shoulder diameters, the degree to which different inner races double as each other can be increased.

Furthermore, according to the invention, when fixing the pulser ring, since the pulser ring can be fixed only by disposing the pulser ring in the stepped portion of the inner race so as to hold it between the stepped portion and the clamping portion, the fixing work of the pulser ring can be simplified when compared with the conventional or related manner in which the pulser ring is press fitted in the inner race at the outside diameter side or the radially outward side thereof. In particular, a risk can be eliminated that the detecting portion of the pulser ring which is located on the radially outward side thereof is damaged.

Moreover, according to the invention, since the pulser ring can be fixed at the same time as the work of bending and deforming the one end side of the inner shaft radially outwards so as to be clamped against the outer end face of the inner race, the work can be simplified, thereby making it possible to reduce the production costs of the rolling bearing unit further.

According to the invention, even with inner races having different shoulder diameters, the position of the pulser ring relative to the magnetic sensor can be easily modified and fixed without requiring to change inner races or to cut the shoulder portion of the inner race.

DETAILED DESCRIPTION OF PREFERRED EMBODIMENTS

Figure 1:
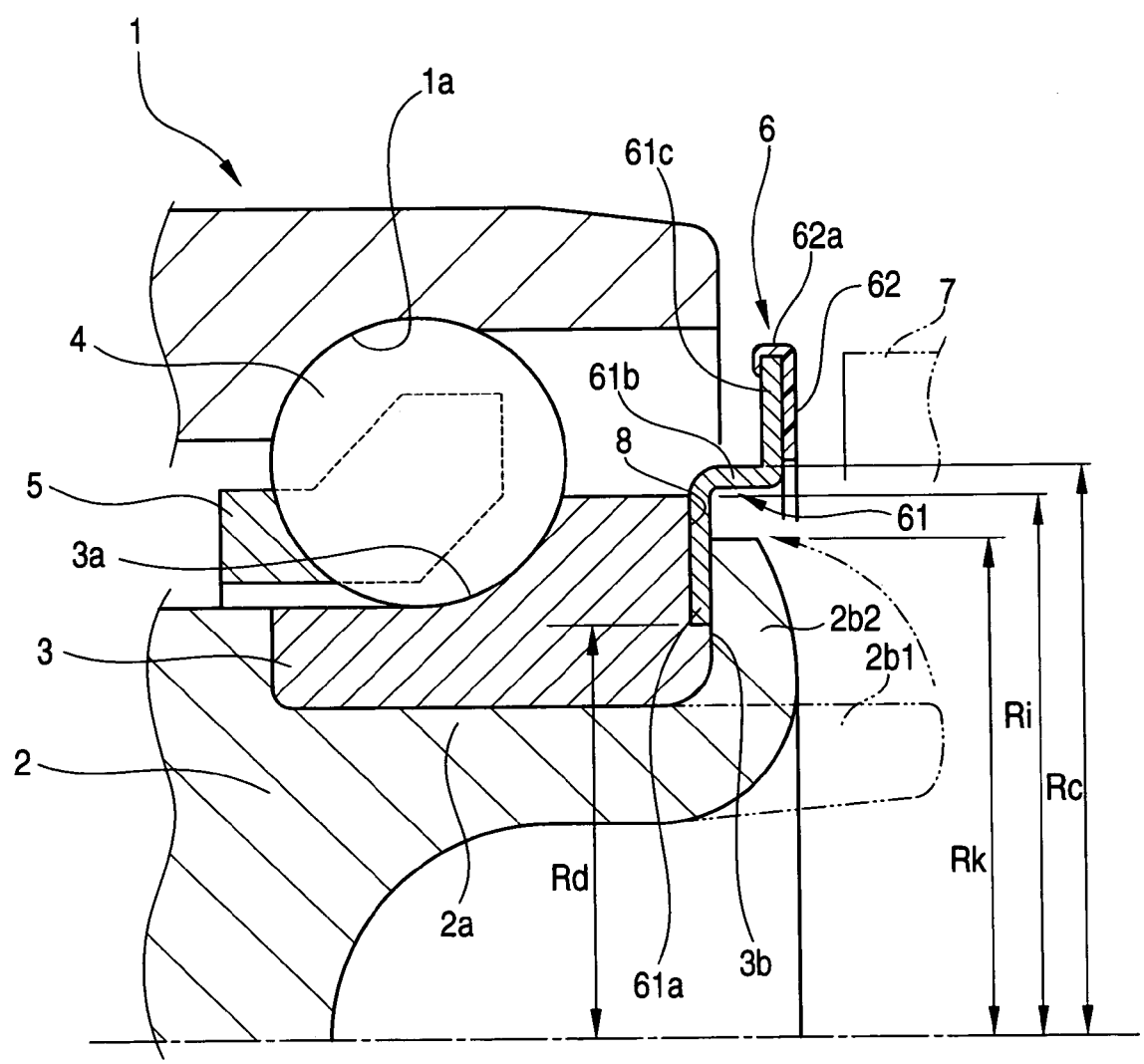
FIG. 1 is a sectional view taken along an axial direction of a rolling bearing unit according to a best mode for carrying out the invention.
Figure 2:
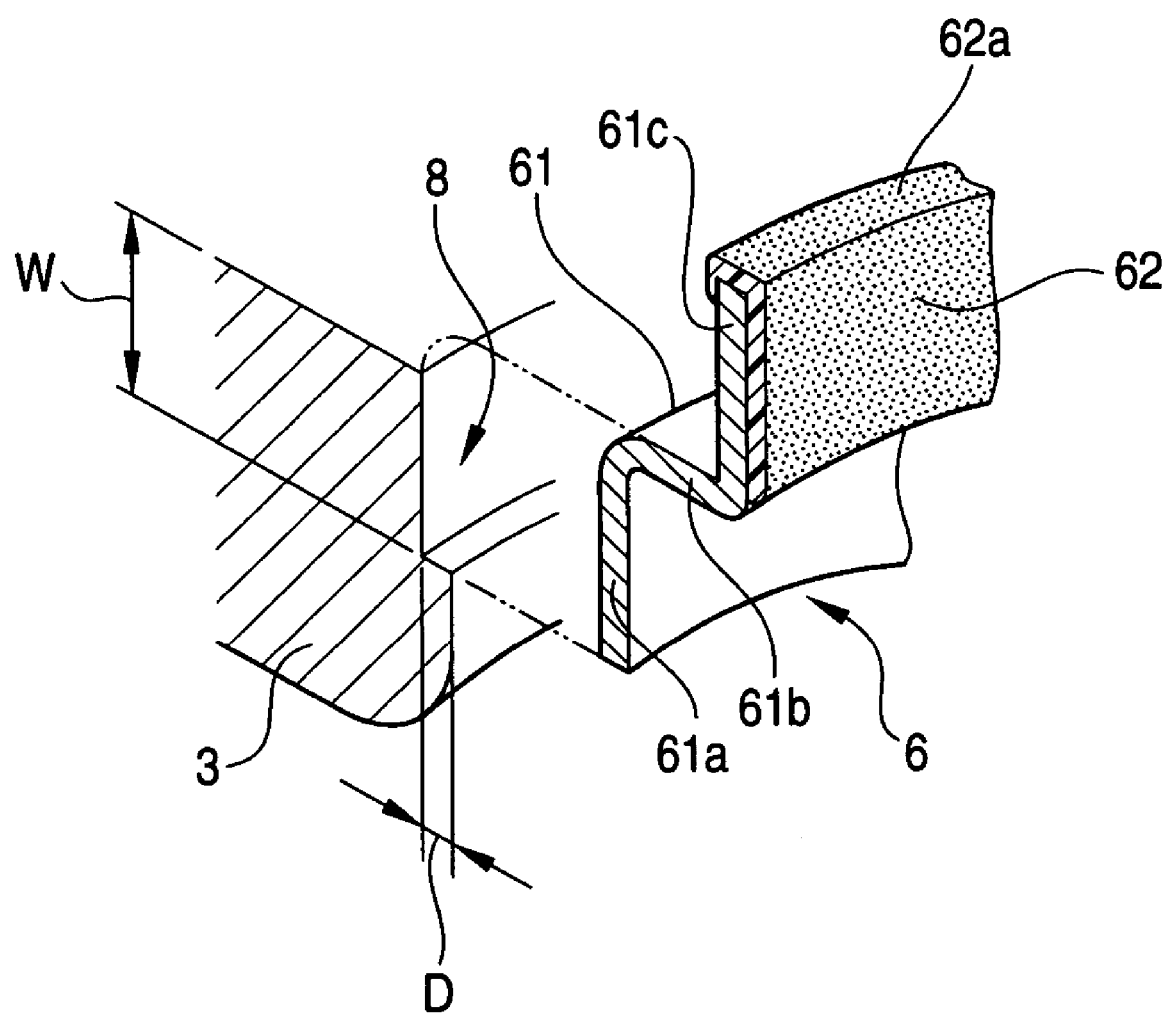
FIG. 2 is an exploded perspective view of a main part of the unit shown in FIG. 1.

Hereinafter, a preferred embodiment according to the invention will be described with reference to the drawings. FIG. 1 is a sectional view of a rolling bearing unit which includes a pulser ring, and FIG. 2 is an exploded perspective view showing the vicinity of the pulser ring. Referring to these drawings, an inner shaft 2 is disposed concentrically within an inner circumference of an outer race 1. A small diameter portion 2a is formed at an axial end side of the inner shaft 2. An inner race 3 is fitted on the small diameter portion 2a of the inner shaft 2. A cylindrical portion 2b1 at the end of the inner shaft 2 is bent and deformed radially outwards so as to be clamped against an outer end face of the inner race 3 to thereby be formed into a clamping portion 2b2, whereby the inner race 3 is fixed to the inner shaft 2. A rolling element 4 is disposed between a raceway portion 1a formed on an inner circumferential surface of the outer race 1 and a raceway portion 3a formed on an outer circumferential surface of the inner race 3 in such a state that the rolling element 4 is retained by a cage 5. The rolling bearing unit is made to constitute an angular ball bearing having the above-described configuration.

A pulser ring 6 is fixed to the inner race 3 in such a manner as to axially face a magnetic sensor 7 functioning as a rotation sensor attached to the outer race 1 or another member. The pulser ring 6 includes a metallic support ring 61 and a multipolar magnet rotor 62 that is made of a magnetized rubber and which has magnetic poles which alternately differ along a circumferential direction.

The support ring 61 has an annular portion 61a situated on an inside diameter or radially inward side thereof, a cylindrical portion 61b which extends axially outwardly from an outside diameter or radially outward edge of the annular portion 61a and an annular portion 61c which extends radially outwards from an axially outer edge of the cylindrical portion 61b. The multipolar magnet rotor 62, which constitutes an example of the detecting portion, is attached to an outer surface of the annular portion 61c of the support ring 61 through joining or the like. The multipolar magnet rotor 62 is integrally provided with a locking portion 62a which covers a radially outward edge of the annular portion 61c in an angular U-like shape or moderate U-like shape as viewed sectionally.

An annular stepped portion 8 is formed on the outer end face 3b of the inner race 3. This stepped portion 8 has a uniform radial width W which extends on the outer end face 3b of the inner race 3 from a radially outward edge to an intermediate portion toward a radially inward edge and a depth D Which substantially corresponds the thickness of the support ring 61 of the pulser ring 6.

The annular portion 61a of the support ring 61 is disposed within the stepped portion 8, and the end portion 2b1 of the inner shaft 2 is clamped toward an outer surface of the annular portion 61a to thereby be formed into the clamping portion 2b2, whereby the annular portion 61a of the support ring 61 is held between the stepped portion 8 and the clamping portion 2b2 to thereby be fixed to the outer end face 3b of the inner race 3.

In this case, an inside diameter Rd of the stepped portion 8 is set smaller than an outside diameter Rk of the clamping portion 2b2 (Rd<Rk) so that the clamping portion 2b2 must overlap the stepped portion 8 partially or entirely in the axial direction.

With this configuration, at the time of attaching the pulser ring 6, preferably, the support ring 61 of the pulser ring 6 is disposed within the stepped portion 8 of the inner race 3 before the end portion's side 21b of the inner shaft 2 is clamped, and the clamping is carried out against the inner race 3 in such a state.

When compared with the conventional manner in which a support ring with an L-shaped cross section is press fitted in the radially outward portion of the inner race, according to the invention, the necessity of a pre-adjustment is obviated of cutting the radially outward portion of the inner race 3 to mach the inside diameter of the support ring 61 or, on the contrary, enlarging the whole of the pulser ring 6 to mach the outside diameter of the inner race 3, and hence the attachment of the pulser ring 6 can be facilitated. In addition, since there is no need to press fit the support ring 61 in the radially outward portion of the inner race 3, a risk can be eliminated that the multipolar magnet rotor 62 is damaged by a press fitting jig.

In a state in which the pulser ring 6 is attached, among the respective portions of the support ring 61, a portion which protrudes further radially outwardly than the clamping portion 2b2 can be made use of as an attachment portion of the multipolar magnet rotor 62, whereby the radial width of the multipolar magnet rotor 62 can be widened irrespective of the outside diameter of the inner race 3.

Furthermore, since the support ring 61 of the pulser ring 6 is held between the stepped portion 8 and the clamping portion 262 in such a state that the support ring 61 is received within the stepped portion, a risk can be eliminated that the support ring 61 is deformed due to the clamping force. In addition, since an inner circumferential edge of the support ring 61 is brought into engagement with a stepped-down portion of the stepped portion 8, there is eliminated a risk that the position of the support ring 61 is caused to deviate in the radial direction.

With the above configuration, the cylindrical portion 61b which bends in a step-like fashion is provided, and a radially outward portion of the support ring 61 of the pulser ring protrudes axially outwards via this cylindrical portion 61b. The entirety of the support ring 61 is reinforced by virtue of the existence of the cylindrical portion 61b, and the risk of deformation of the support ring 61 that would be caused by the clamping by the clamping portion 2b2 can be suppressed in a further ensured fashion. In addition, since the radially outward portion of the support ring 61 protrudes axially outwards, the gap between the multipolar magnet rotor 62 and the magnetic sensor 7 is narrowed, thereby increasing the detection accuracy.

Note that among the respective portions of the support ring 61 of the pulser ring 6, the portion which is situated further radially outwards than the annular portion 61a on the inner circumferential side can take any selected arbitrary shape, provided that a shape selected does not interrupt the clamping work, and hence can take, for example, a shape in which the portion continues flush with the annular portion 61a on the inner circumferential side therefrom and a shape in which the portion protrudes axially outwards in a cylindrical fashion via the cylindrical portion with the L-shaped cross section.

In the embodiment, an outside diameter Rc of the cylindrical portion 61b is set larger than the outside diameter Ri of the shoulder portion of the inner race 3 which is set larger than the outside diameter Rk of the clamping portion 2b2.

The invention can be applied to rolling bearing units of a type in which the inner race is attached to the inner shaft by way of clamping and which includes, for example, rolling bearing units which use balls as rolling elements and roller bearing units which use tapered rollers and cylindrical rollers as rolling elements.

For example, in the 2.5-generation wheel supporting rolling bearing units which include an outer race having first and second raceway portion formed on an inner circumferential surface thereof, an inner shaft that is disposed on an inner circumferential side of the outer race and which has a wheel mounting flange portion formed on an outer circumferential surface thereof, two inner races which has raceway portions facing the first and second raceway portions, respectively, and a plurality of rolling elements disposed between the raceway portions, the invention is such as to be applied to the rolling bearing units when an end side of the inner shaft is clamped against outer end faces of the inner races to thereby form a clamping portion.

For example, in the 3-generation and 3.5-generation wheel supporting rolling bearing units which include an outer race having first and second raceway portions formed on an inner circumferential surface thereof, an inner shaft that is disposed on an inner circumferential side of the outer race and which has a wheel mounting flange portion, a raceway portion facing the first raceway portion and a small diameter portion which are formed on an outer circumferential surface thereof, an inner race that is attached on to the small diameter portion and which has a raceway portion formed on an outer circumferential surface thereof in such a manner as to face the second raceway portion and a plurality of rolling elements disposed between the raceway portions, the invention is also such as to be applied when an end side of the inner shaft is clamped against an outer end face of the inner race to thereby form a clamping portion.

What is claimed is:

1. A rolling bearing unit comprising:
an inner shaft that includes an outer circumferential surface and a clamping portion formed by bending one end portion of the inner shaft;
an inner race fitted on the outer circumferential surface of the inner shaft and clamped by the clamping portion, whereby the inner race is fixed to the inner shaft, the inner race including an annular stepped portion formed on a radially outward side of an outer end face of the inner race; and
a pulser ring that is disposed in the stepped portion and is held between the stepped portion and the clamping portion, whereby the pulser ring is fixed to the stepped portion.

2. The rolling bearing unit according to claim 1, wherein the pulser ring comprises a metallic support ring and a magnetized rubber.

3. The rolling bearing unit according to claim 2, wherein the support ring includes a first annular portion situated on an inside diameter side, a cylindrical portion which extends axially outwardly from a radially outward edge of the first annular portion, and a second annular portion which extends radially outward from an axially outer edge of the cylindrical portion.

4. The rolling bearing unit according to claim 3, wherein the first annular portion, the cylindrical portion and the second annular portion are axially outwardly arranged in this order.

5. The rolling bearing unit according to claim 3, wherein following inequality is satisfied:

$$Rd<Rk<Ri<Rc$$

where Rd represents an inside diameter of the stepped portion, Rk represents an outside diameter of the clamping portion, Rc represents an outside diameter of the cylindrical portion and Ri represents an outside diameter of a shoulder portion of the inner race.

6. The rolling bearing unit according to claim 1, wherein the pulser ring is fixed to the inner race so as to axially face a magnetic sensor which is a rotation sensor attached to an outer race, and the pulser ring has magnetic poles which alternately differ along a circumferential direction.

7. The rolling bearing unit according to claim 6, wherein an outer side face of the pulser ring which is disposed in the stepped portion is clamped by the clamping portion, whereby the pulser ring is fixed to the outer end face of the inner race.

8. The rolling bearing unit according to claim 1, wherein the stepped portion has a uniform radial width which extends on the outer end face of the inner race from a radially outward edge of the inner race to an intermediate portion of the inner race and a depth which substantially corresponds to a thickness of the pulser ring.

9. The rolling bearing unit according to claim 1, wherein an inside diameter of the stepped portion is set smaller than an outside diameter of the clamping portion so that the clamping portion overlaps the stepped portion partially or entirely in the axial direction.

* * * * *